United States Patent [19]
Voltz

[11] Patent Number: 5,892,933
[45] Date of Patent: Apr. 6, 1999

[54] DIGITAL BUS

[75] Inventor: Christopher D. Voltz, Houston, Tex.

[73] Assignee: Compaq Computer Corp., Houston, Tex.

[21] Appl. No.: 829,202

[22] Filed: Mar. 31, 1997

[51] Int. Cl.$^6$ ...................................................... G06F 13/00
[52] U.S. Cl. ............................................................ 395/311
[58] Field of Search .................................. 395/311, 312, 395/309, 287, 280, 306

[56] References Cited

U.S. PATENT DOCUMENTS 5,465,355  11/1995  Cook et al. ............................. 395/311
5,528,765   6/1996  Milligan .................................. 395/287
5,590,284  12/1996  Crosetto ................................. 395/311

*Primary Examiner*—Glenn A. Auve
*Attorney, Agent, or Firm*—Jenkens & Gilchrist

[57] ABSTRACT

A segmenting scheme and arrangement for digital serial busses such as an I$^2$C bus is provided. The segments are broken apart from the master unit by a switch such as a low-impedance bidirectional analog multiplexer. The bus may be of various types such as an I$^2$C, a Universal Serial Bus or other similar types of busses. The bus is bidirectional from the various slave or downstream units to the master unit and the various slave devices can operate at different speeds by allowing each segment to adjust the speed of that segment.

22 Claims, 3 Drawing Sheets

DIGITAL BUS

BACKGROUND OF THE INVENTION

1. Field of the Invention

The present invention relates generally to an improved apparatus and method for attaching devices to a digital serial bus such as an I²C type of bus.

2. Description of the Related Art

Various types of digital serial busses have been known. One example of this type of bus is an I²C bus. These types of busses allow for low cost serial communication between electronic systems. However, as the speed of such buses are raised, various problems exist. For example, an I²C bus is limited in speed to the slowest device "hanging" on the bus. This is not a problem if the devices on the bus only need to send a very limited amount of data and/or this data is sent very infrequently. As the amount of data to be sent on the bus increases or the frequency at which devices are polled or send data increases or when a combination of these two situations occur, the limiting of the bus to the slowest device becomes problematical.

As an example using FIG. 1 as a reference, suppose a single I²C master 28 were used to connect to slave devices 40, 42, 44, and 46. If I²C slave device 40 could only operate at 10 kHz, the remaining I²C slave devices 42, 44 and 46 would be limited to that speed even if these devices might normally operate at 100 kHz. Either wait states would need to be added to the other I²C slave devices 42, 44 and 46 or some other method (for example, the master could drive the clock for the bus slower) would be required. This is an unacceptable slow down of the communication system. Further, the capacitive loading of the I²C bus becomes an issue as more devices or high capacitive devices (such as monitors) are added. Even if all the I²C slaves 40, 42, 44 and 46 normally have the same speed, if one of these devices has a high capacitive load, the speed on that segment would be slower. A further complication, well known to those skilled in the art, is that the termination of the I²C bus becomes problematical as well.

One approach that might be tried is shown in FIG. 2 where multiple I²C masters 22, 24 and 26 are employed. However, as I²C masters are relatively expensive devices, this type of segmentation is expensive. Further, the number of bus connections from the microcontroller (or microprocessor) 10 becomes cumbersome or is limited, which makes device coordination difficult.

SUMMARY OF THE INVENTION

The present invention overcomes the shortcoming and deficiencies noted above by providing a new way of interconnecting and controlling the connection of an I²C master on an I²C bus to I²C slave devices. Following the teachings of the present invention, multiple I²C slaves can be connected to one I²C master device without unduly capacitively loading the I²C bus. Further, according to the teachings of the present invention, a plurality of slave devices can be attached to an I²C bus master so that the most advantageous termination for each (or at least several) of the slave devices can be employed, and so that an I²C bus can be segmented to group like speed devices together, so as to maximize the total speed of the system.

In broad terms, the present invention provides a serial digital bus segmentation system including at least one serial digital bus master having a coupling to serial digital devices along a serial digital bus, and at least one switch, e.g., a bidirectional analog multiplexer, coupled to the serial digital bus master and having at least three connections, one for connecting to a master, and the other two for connecting to other devices.

Also, in broad terms, the present invention provides a method for attaching slave devices to a digital serial bus including the steps of segmenting the bus, and providing for connecting the bus segments to a bus master through a switch.

BRIEF DESCRIPTION OF THE DRAWINGS

Other advantages and novel features of the present invention can be understood and appreciated by reference to the following detailed description of the invention, taken in conjunction with the accompanying drawings in which.

DETAILED DESCRIPTION OF THE INVENTION

Figure 1:
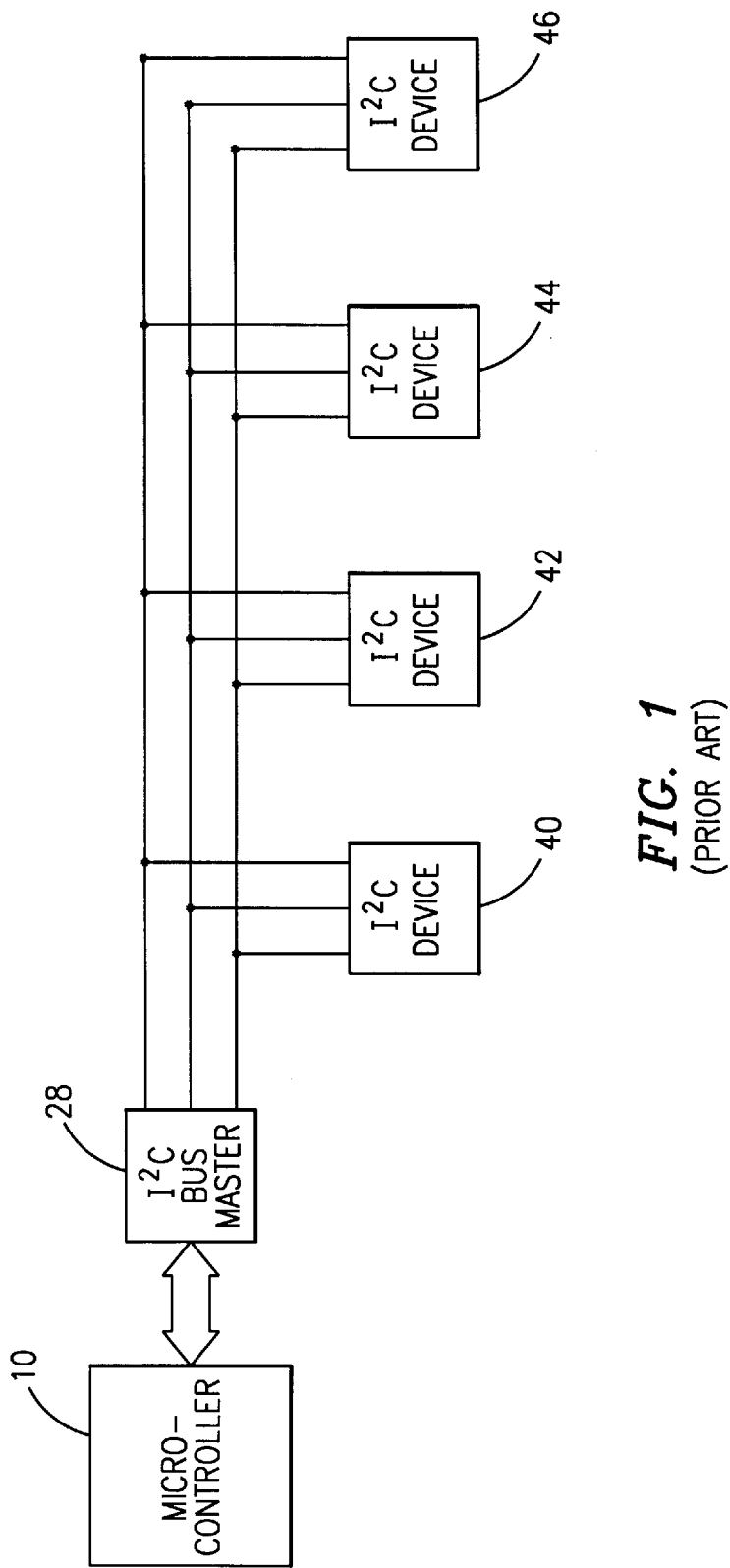
FIG. 1 is an example of a microcontrolled digital serial bus such as an I²C bus.

Referring now to the drawings wherein like or similar elements are designated with identical reference numerals throughout the several views, and wherein the various elements are depicted in block form and, in particular, to FIG. 1, there is shown a microcontrolled digital serial bus.

As mentioned above, the circuit of FIG. 1 shows several devices on an I²C type of bus. It should be noted that although this invention is being described using an I²C bus, the use of the I²C bus is only an example. This unique arrangement could be used with other types of digital serial busses. However, the I²C bus particularly lends itself to the unique, unobvious solution set forth herein.

Figure 2:
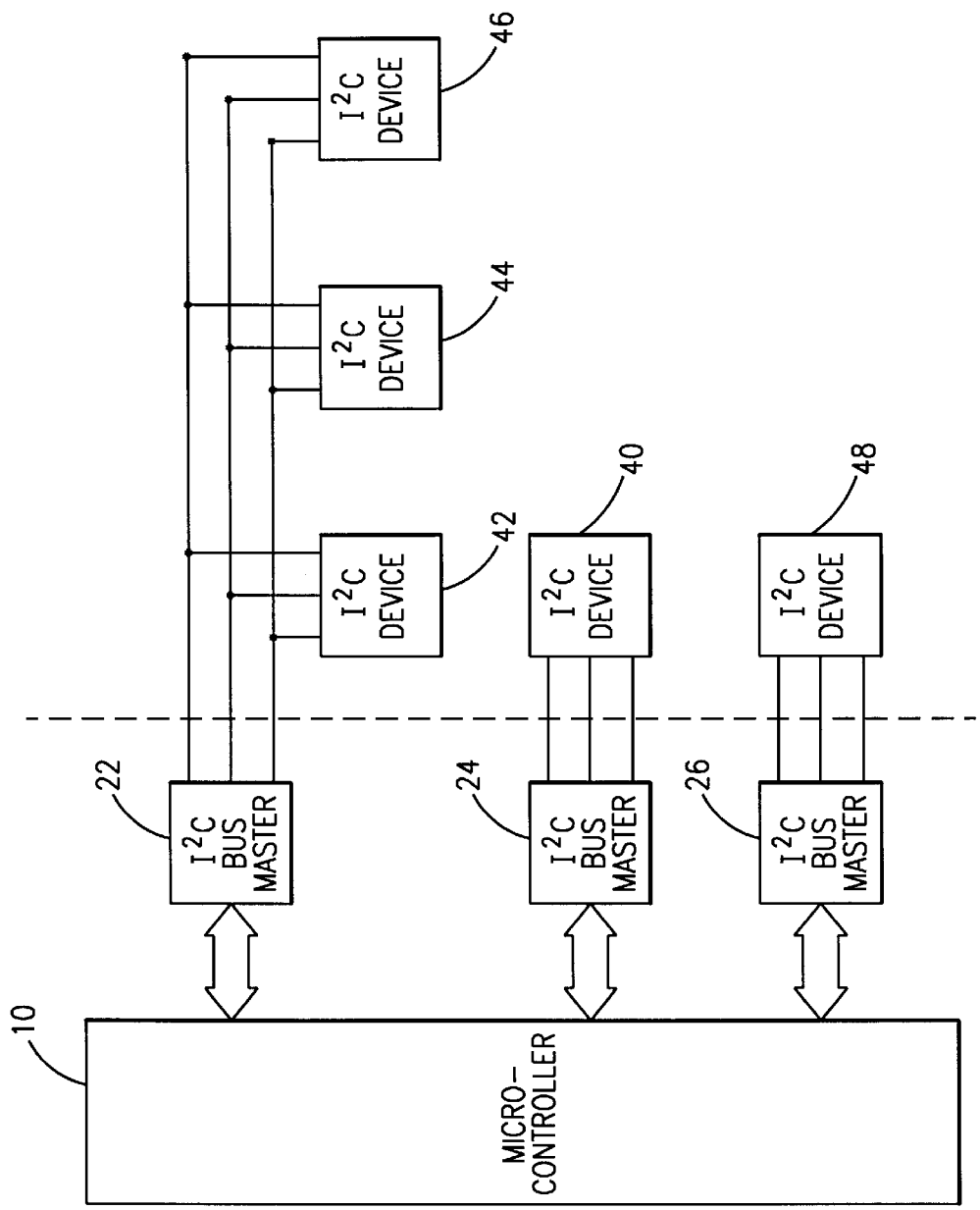
FIG. 2 is an example of a solution to the interconnection problem set forth in FIG. 1.

As can be seen looking at FIG. 1 and FIG. 2 the intuitive method of segmenting an I²C bus requires multiple I²C masters such as 22, 24 and 26. This approach makes sense, for example, if device 40 was a slow speed device, either by virtue of a high capacitive load or by virtue of a very slow clock speed or the like. In such a case, device 40 is advantageously placed on its own segment. As another example, if device 48 is especially "talkative" and needs to be polled on a rapid basis or if it sends long streams of data when polled, it makes sense to place it on its own segment also, as shown. Slave devices 42, 44 and 46 would operate on their segment of the I²C bus at the slowest speed of the three devices 42, 44, and 46.

Figure 3:
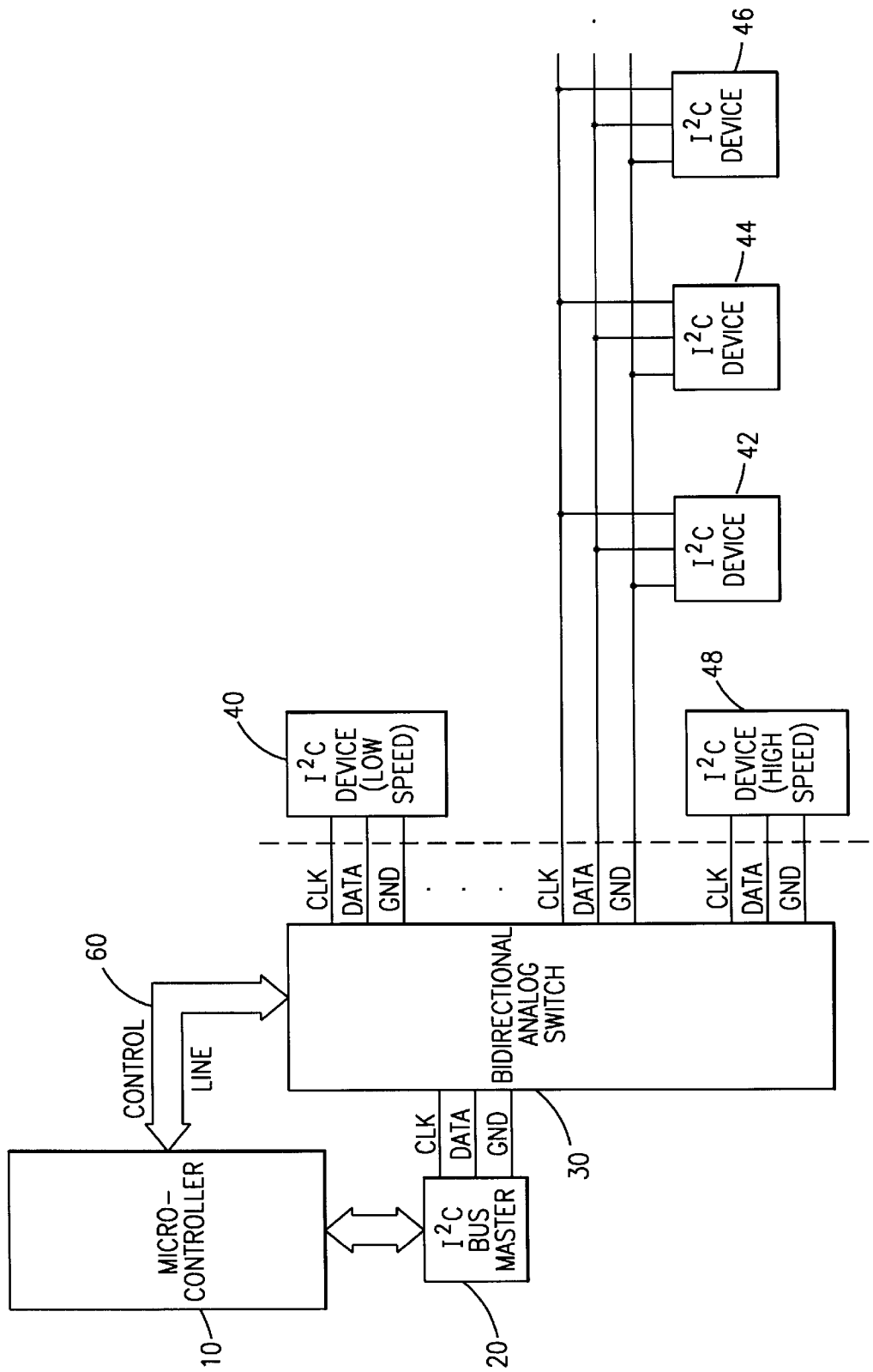
FIG. 3 is a block diagram of one embodiment of this invention.

The solution to the requirement of the multiple I²C masters 22, 24 and 26 in this invention can be seen in FIG. 3 where each of the I²C segments are coupled to a single I²C master 20 by way of a switch, e.g., an analog multiplexer 30. An analog multiplexer may be used even though the signals passing through the multiplexer are digital in nature as the multiplexer is a low capacitance/low impedance bidirectional analog multiplexer. A good example of this type of multiplexer is a HC4052. Alternatively, a digital multiplexer or any of a number of different "switches" could be used in embodiments of the present invention.

In operation, the controller 10, when wanting to communicate with, for example, the I²C slave device 40, would under software control send a signal to the analog multiplexer 30 over control line 60 to indicate that the analog multiplexer 30 should connect the I²C slave device 40 to the $I^2C$ bus master 20. It should be noted that the control line 60 may be made up of several lines so as to facilitate an easy switching of segments by the analog multiplexer 30. To communicate on the segment where slave devices 42, 44 and 46 are placed, a software controlled signal is sent from the microcontroller 10 to the analog multiplexer 30 so as to connect the desired segment to the $I^2C$ bus master 20, and the same would be true with respect to the segment for slave device 48. Further, as the speeds of the various segments may well be different, the same controller 10 can provide, at the same time as the switch command, a resetting of the appropriate speed to the $I^2C$ bus master 20.

Further, by having this type of segmentation, if different levels of termination or pull ups are needed on a given segment, this can be accomplished based upon the type of slave devices attached to each segment. For example, the segment connecting $I^2C$ slave 40 may need a stronger pullup than the segment supporting $I^2C$ slave devices 42, 43, and 46.

Obviously, numerous modifications and variations are possible in view of the teachings above. For example, the $I^2C$ bus may be, as noted above, a different type of serial digital bus. Further, the speeds of the devices may all be the same but a segmentation of the bus may be needed for load balancing purposes. Accordingly, the present invention is not limited by the embodiments disclosed, but is capable of numerous rearrangements, modifications, and substitutions, without departing from the spirit and scope of the invention as set forth and defined by the following claims.

What is claimed is:

1. A serial digital bus segmentation system comprising:

at least one serial digital bus master arranged to be coupled to serial digital devices along a serial digital bus, said serial digital bus master having an input;

at least one switch coupled to said input of said serial digital bus master and having at least three connections, one connection for said at least one serial digital bus master, and at least two connections for other serial digital devices, wherein said switch comprises a multiplexer.

2. A system as recited in claim 1, wherein said multiplexer comprises an analog multiplexer.

3. A system as recited in claim 2, wherein said analog multiplexer comprises a bidirectional analog multiplexer.

4. A system as in claim 3 further comprising:

means to provide a control signal to said bidirectional analog multiplexer.

5. A system as in claim 4 wherein said means to provide said control signal to said bidirectional analog multiplexer further comprises:

communication means to couple to said serial digital bus master.

6. A serial digital bus segmentation system comprising:

at least one serial digital bus master arranged to be coupled to serial digital devices along a serial digital bus, said serial digital bus master having an input;

at least one switch coupled to said input of said serial digital bus master and having at least three connections, one connection for said at least one serial digital bus master, and at least two connections for other serial digital devices; and at least one digital serial device coupled to said switch.

7. A system as in claim 6 further comprising:

at least one additional digital serial device coupled to said switch.

8. A serial digital bus segmentation system comprising:

at least one serial digital bus master arranged to be coupled to serial digital devices along a serial digital bus, said serial digital bus master having an input;

at least one switch coupled to said input of said serial digital bus master and having at least three connections, one connection for said at least one serial digital bus master, and at least two connections for other serial digital devices, and wherein said serial digital bus is an $I^2C$ bus.

9. A computer based system including a serial digital bus segmentation system comprising:

at least one serial digital bus master arranged to be coupled to serial digital devices along a serial digital bus, said serial digital bus master having an input;

at least one switch coupled to said input of said serial digital bus master and having at least three connections, one connection for said at least one serial digital bus master, and at least two connections for other serial digital device, wherein said switch comprises a multiplexer.

10. A system as recited in claim 9, wherein said multiplexer comprises an analog multiplexer.

11. A system as recited in claim 10, wherein said analog multiplexer comprises a bidirectional analog multiplexer.

12. A system as in claim 11 further comprising:

means to provide a control signal to said bidirectional analog multiplexer.

13. A system as in claim 12 wherein said means to provide said control signal to said bidirectional analog multiplexer further comprises:

communication means to couple to said serial digital bus master.

14. A system as in claim 11 further comprising:

at least one digital serial device coupled to said bidirectional analog switch.

15. A system as in claim 14 further comprising:

at least one additional digital serial device coupled to said bidirectional analog switch.

16. A computer based system including a serial digital bus segmentation system comprising:

at least one serial digital bus master arranged to be coupled to serial digital devices along a serial digital bus, said serial digital bus master having an input;

at least one switch coupled to said input of said serial digital bus master and having at least three connections, one connection for said at least one serial digital bus master, and at least two connections for other serial digital device, wherein said serial digital bus is an $I^2C$ bus.

17. A method for attaching slave devices to a digital serial bus comprising the steps of:

segmenting the bus; and providing for connecting bus segments to a bus master through a switch, wherein said switch comprises a multiplexer.

18. The method of claim 17, wherein said multiplexer comprises a bidirectional analog multiplexer.

providing for connecting bus segments to a bus master through a switch, wherein said digital serial bus is an $I^2C$ bus.

19. A method for attaching slave devices to a digital serial bus comprising the steps of:

segmenting the bus; and providing for connecting bus segments to a bus master through a switch, wherein said digital serial bus is an $I^2C$ bus.

20. A serial digital bus segmentation system for providing serial data communications between a controller and a plurality of devices, wherein at least two of the plurality of devices communicate with the controller at different speeds, said serial digital bus segmentation system comprising:

at least two serial digital bus sections;

at least one serial digital bus master configured to receive control data and serial data from the controller and selectively output said serial data at a speed as identified by said control data, said speed being selected from a group comprising at least a first speed and a second speed, wherein said first speed and said second speed are different speeds; and at least one switch arranged to receive said control data from the controller and said serial data from said serial digital bus master and selectively provide said serial data to at least one of the plurality of devices through at least one of said serial digital bus sections.

21. A computer system having the capability of supporting data communications at different speeds, said computer system comprising:

a controller;

a plurality of devices;

at least two serial digital bus sections;

at least one serial digital bus master configured to receive control data and serial data from said controller and selectively output said serial data at a speed as identified by said control data, said speed being selected from a group comprising at least a first speed and a second speed, wherein said first speed and said second speed are different speeds; and at least one switch arranged to receive said control data from said controller and said serial data from said serial digital bus master and selectively output said serial data to at least one of said plurality of devices through at least one of said serial digital bus sections.

22. A method for attaching slave devices to a digital serial bus comprising the steps of:

segmenting the digital serial bus into at least a first section and a second section, said first section being arranged between a first slave device and a switch, said second section being arranged between a second slave device and said switch, said switch being configured to selectively couple a master device to at least one of said sections; and controlling said switch, such that data from said master device having a first speed is provided to said first section and data from said master device having a second speed is provided to said second section, wherein said first speed and said second speed are different speeds.

* * * * *

UNITED STATES PATENT AND TRADEMARK OFFICE
CERTIFICATE OF CORRECTION

PATENT NO : 5,892,933
DATED : April 6, 1999
INVENTOR(S) : Christopher D. Voltz

It is certified that error appears in the above-identified patent and that said Letters Patent is hereby corrected as shown below:

Column 4, lines 59-61   Delete in its entirety "providing for connecting bus segments to a bus master through a switch, wherein said digital serial bus is an $I^2C$ bus."

Signed and Sealed this

Twenty-fifth Day of January, 2000

Attest:

Attesting Officer

*Acting Commissioner of Patents and Trademarks*